No. 47,986. PATENTED MAY 30, 1865.
S. C. SALISBURY.
APPARATUS FOR THE MANUFACTURE OF GAS.
2 SHEETS—SHEET 1.
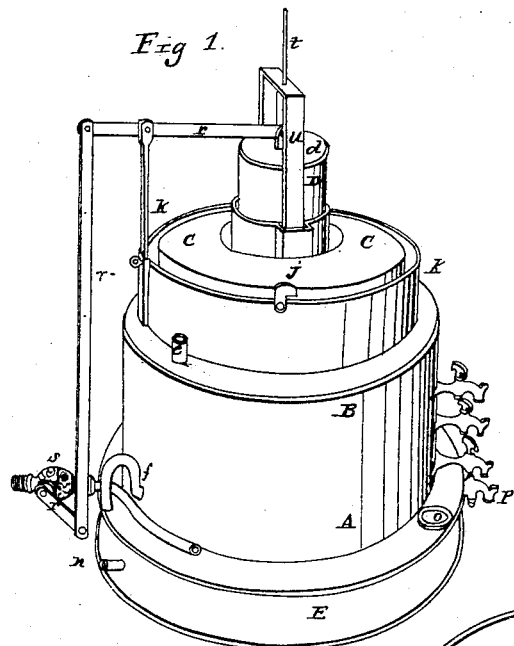
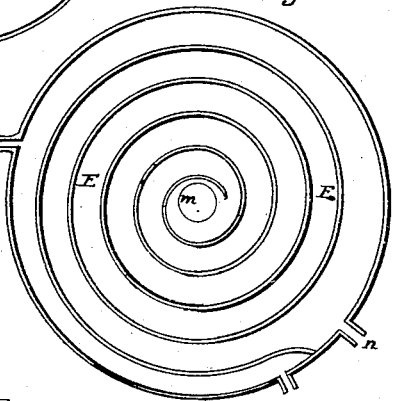
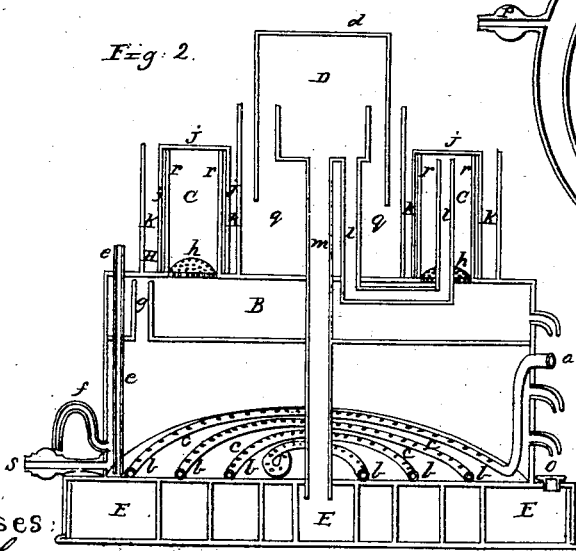
Witnesses:
Inventor:
Silas C. Salisbury No. 47,986. PATENTED MAY 30, 1865.
S. C. SALISBURY.
APPARATUS FOR THE MANUFACTURE OF GAS.
2 SHEETS—SHEET 2.
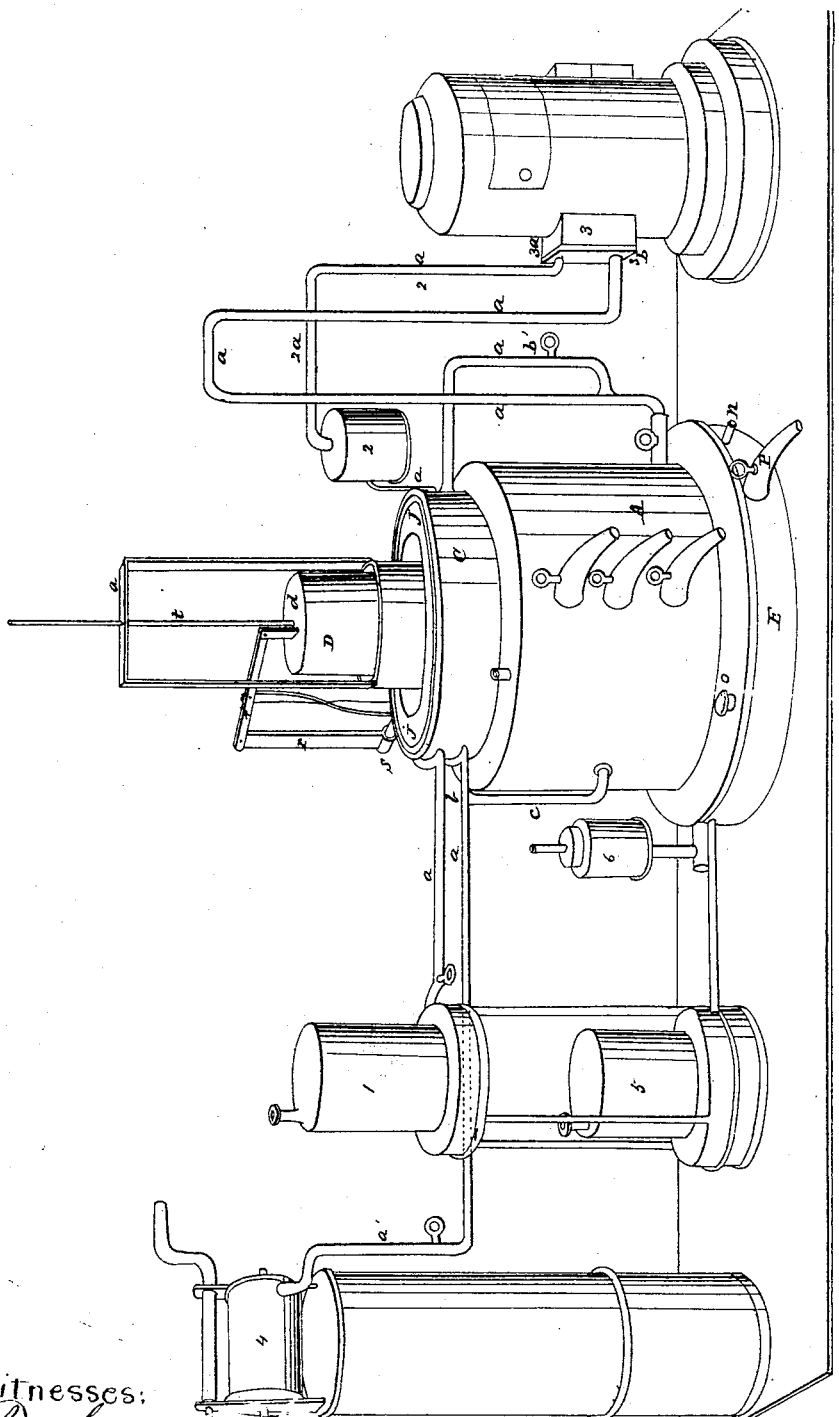
Witnesses:
Inventor:
Silas C. Salisbury

UNITED STATES PATENT OFFICE.

SILAS C. SALISBURY, OF NEW YORK, N. Y.

IMPROVED APPARATUS FOR THE MANUFACTURE OF GAS.

Specification forming part of Letters Patent No. 47,986, dated May 30, 1865.

*To all whom it may concern:*

Be it known that I, SILAS C. SALISBURY, of the city of New York, in the county of New York and State of New York, have invented certain new and useful Improvements in Apparatus for the Manufacture of Gas; and I do hereby declare that the following is a full, clear, and exact description thereof and of the mode or manner of operation, reference being had to the accompanying drawings, and to the letters of reference marked thereon and making a part of this specification.

The general nature of my invention consists in the production of a compact and effective apparatus for the manufacture or production of gas for burning, which can be used in the manufacture either of fixed gas from petroleum-oil, resins, or other substances rich in carbon, or of "vapor-gas," so called, and by which also the gas may be manufactured only as fast as required for consumption, thereby dispensing with the necessity of providing a gas-holder of sufficient size to hold a stock of gas.

Figure 1, Plate I, is a general perspective view of the entire apparatus. Fig. 1, Plate II, is an enlarged perspective view of the washing, purifying, and cooling chambers and their connections with the automatic regulator. Fig. 2, Plate II, is a vertical sectional view of Fig. 1. Fig. 3, Plate II, is a plan view of the interior of the cooling-chamber.

The same letters in the several figures refer to like parts of the apparatus.

As before stated, this apparatus may be used for the manufacture or production either of fixed gas from petroleum-oils, resins, or other substances rich in carbon, or for the production of vapor-gas.

When used in the manufacture of fixed gas from petroleum, the process and operation are as follows: The crude oil is supplied from a vessel or fountain, 1, and is conducted therefrom by a pipe, 1ˣ, to the vaporizer 2. Such fountain may be constructed in the manner described in Letters Patent granted to S. T. McDougall, January 3, 1865, by which the requisite quantity of oil is permitted to pass into the vaporizer without material pressure. In the vaporizer 2 the oil is subjected to heat and vaporized before it passes to the retort. In its natural state the crude oil is made up or composed of parts having different specific gravities; but by vaporizing the oil the matter which passes into the retort is made practically of uniform specific gravity, whereby there is obtained not only a larger amount of gas from a given quantity of material, but there is also prevented any considerable accumulation of residuums in the form of tar, &c. Such vaporizer may be made in the manner described in Letters Patent granted S. T. McDougall, March 13, 1860. From such vaporizer the vaporized oil is conducted by a pipe, 2ˣ, to the retort 3, which may be placed in a furnace or in any suitable place for heating. I prefer to make this retort with two compartments, one of which may be charged with limestone and zinc or any substances having a proper affinity for the residuums of the oil. The vapor of the crude oil is admitted first into the compartment 3ᵃ, and then passes into the other compartment, 3ᵇ, charged with the limestone and zinc, and during the passage through which the vapor becomes a fixed gas. Such arrangement or construction of retort causes the vapor at first to pass into the compartment having the lesser degree of heat, and also economizes the heat, keeps the retort at a more uniform temperature, and lessens the danger of fracture from expansion and contraction. From the retort 3 the gas is conducted by a pipe, $a$, to the washing-chamber A, which is partially filled with water. Such pipe, instead of opening directly into the bottom of the chamber A and discharging the gas from an orifice the size of the pipe, is coiled around the bottom of the chamber, as shown in Fig. 2, Plate II, and is perforated with numerous small holes, $c\ c$, through which the gas passes into the chamber. The gas is thus divided into numerous small jets, and by being caused to pass out through the small orifices $c\ c$ in the coils $b\ b$ it is thereby more completely mixed with the water, and more effectually washed. Water is admitted to the chamber A through a pipe, $e$, and such chamber may also be furnished with a siphon, $f$, so that fresh water can be continually admitted into such chamber and the impure water discharged. A more complete washing of the gas is thus effected, and the gas is also at the same time partially cooled. As the gas is being conducted to the washing-chamber A, it is met by an air-blast coming through the pipe $a'$ and produced by the blower 4. Such blower may be arranged in the manner set forth in Letters Patent granted J. H. Hendrix, February 17, 1857. Such air-blast should be sufficient to force the gas through the water in the chamber A, and prevent the gas being forced back into the retort, thus removing or obviating back-pressure upon the retort. The mingling of a proper quantity of air with the gas also increases the quantity of light produced by the gas when burned, because the gas, generally, as it leaves the retort is too rich in carbon to burn without smoking, and requires the addition of air to bring it to a proper condition for producing the greatest amount of light. After the gas has passed through the water, it enters a chamber, B, through a pipe, $g$, and from thence passes into the purifying-chamber C through a number of wire-gauze or perforated plates, $h$ $h$. Such chamber is filled with lime or other suitable purifying substance between its walls $l'$ $l'$, and over these is placed a movable jacket and cover, $j$, which rests in the water spaces $k$ $k$, thereby preventing any escape of gas from the chamber C. Such arrangement of purifying-chamber allows of the easy removal of the lime or other substance from it, and of its being refilled without any disarrangement of the other parts of the apparatus. After the gas has been purified by passing through the chamber C, it is conducted by the pipe $l$ into the automatic regulator D, hereinafter described, and thence it passes downward through the pipe or tube $m$ in the center of the apparatus into the cooling-chamber E, which is divided by a vertical partition arranged in a coil, as shown more plainly in Fig. 3, Plate II. Such chamber E is kept partially filled with water, and the gas in passing around through such coil is exposed to a large surface of water in a small space and receives a further cooling, and is delivered therefrom, ready for use, through a pipe, $n$, for distribution into the pipes connecting with the burners. Fresh water is admitted into the chamber E through an opening, $o$, and discharged therefrom by a faucet, $p$.

The washing-chamber A, purifying-chamber C, and cooling-chamber E are represented in the drawings as being arranged above each other, so as to constitute one apparatus, and this arrangement is advantageous, because the apparatus can be set up as it is constructed at the manufactory without the necessity of connecting the several members at the place of use; but it is evident that these members may be constructed so as to be set up separately from each other, and still combined by connecting-pipes, so that their action will be the same. The cooling-chamber E is also represented as divided by a continuous coiled partition; but such division may be effected by rectangular partitions extending backward and forward across such chamber, the end sought being to cause the gas to pass over the largest surface of water possible in the smallest area.

In connection with the apparatus described I make use of a peculiar automatic regulator, D, by means of which the supply of oil to the vaporizer and retort is regulated according to the quantity of gas consumed. Such regulator is similar to an ordinary gas-holder, but of small size, consisting of an inverted vessel, $d$, entering by its open end into the water tank or space $q$, and guided, as it moves up and down, by a rod, $t$, passing through the frame $u$. This vessel $d$ is combined by means of a series of connecting-levers or valve-gearing, $r$ $r$, with the faucet or valve $s$ in the pipe which supplies the oil to the vaporizer and retort, so that the faucet is moved by the descent and rise of the vessel $d$ to open and close the communication between the retort and the vessel from which it is supplied with oil. Suppose the apparatus is arranged to furnish gas for a half-dozen burners. If, now, the gas is turned off from all the burners but two, the pressure of the gas increases, and this forces up the vessel $d$. As this rises, it operates the levers $l$ $l$, so as to partially close the valve $s$ and reduce the supply of oil to the vaporizer and retort, and consequently the quantity of gas produced. If, now, other burners are lighted, the vessel $d$ descends by its own gravity as the gas under it is consumed, and as it descends it opens the valve $s$, and a larger supply of oil is furnished for the retort, and consequently a greater quantity of gas produced. The supply to the retort of the material from which the gas is produced is thus automatically regulated according to the quantity of gas consumed. The drawings show but one set of such levers or valve-gearing; but a like arrangement of levers is employed to combine the vessel $d$ with the valve or stop-cock $b'$ in the air-tube $a'$, so that the quantity of air supplied will be more or less, according to the increased or diminished supply of oil to the vaporizer and retort.

For the production of vapor-gas from naphtha or other vaporizable hydrocarbon, the operation is substantially as follows: Heat not being required, the connection with the retort is closed. The washing-chamber A and purifying-chamber C also are not used. The chamber E is partially filled with water, as before, and on the surface thereof there is supplied continually naphtha or other vaporizable hydrocarbon to the depth of about an eighth of an inch. This naphtha is supplied from a hydrostatic fountain, 5, (which may be constructed like the petroleum-fountain 1, so as to supply the naphtha without material pressure,) on a level with the water in such chamber E. Over the surface of the naphtha a constant current of air is forced by the blower 4 through the pipe $c'$, (communication with the pipe $a'$ being cut off by the stop-cock $b'$,) and the air being caused to pass through the entire coil in the chamber E, abundance of time and of surface is secured for the air to take up a sufficient quantity of the hydrocarbon to produce a good vapor-gas. The naphtha also being constantly supplied from the fountain 5, the air takes it up freely, condensation is prevented, and a uniform light is secured. Such vapor-gas may also be caused to pass through a wire-gauze regulator, 6, Plate I, which effects a more thorough mixture of the air and hydrocarbon vapor, and thereby prepares it for more perfect combustion. It is then passed to the burners through the same distributers as those used for the fixed gas.

The petroleum and naphtha fountains 1 and 5 may be placed at any distance from the retort and apparatus, and even outside of the dwelling or building containing the other apparatus, so that all possible danger from them can be wholly prevented.

What I claim as my invention, and desire to secure by Letters Patent, is—

1. The combination of the washing and purifying chambers and automatic regulator, so that the gas passes through them in succession, substantially as described.

2. The arrangement of the washing and purifying chambers and automatic regulator, as described, so that they constitute one apparatus, substantially as and for the purposes set forth.

3. The combination of the washing and purifying chambers and automatic regulator with the cooling-chamber, substantially as and for the purposes set forth.

4. The combination of the cooling-chamber, constructed substantially as described, with a retort for the production of fixed gas.

5. The purifying-chamber C, constructed substantially as described, and for the purposes set forth.

6. The combination of the movable vessel or gas-receiver $d$ with the faucet in the supply-pipe $2^a$, connecting the vaporizer 2 and retort 3, so as to constitute an automatic regulator of the supply of the vaporized products of the vaporizer to the retort, substantially as and for the purposes set forth.

7. The combination of the movable vessel $d$ with the stop-cock of the air-supply pipe, so as to constitute an automatic regulator of the supply of air to the gas, substantially as described, and for the purposes set forth.

8. A washing-chamber constructed substantially as described—that is to say, of a vessel in the lower part of which is a conduit for gas, perforated with numerous small holes, so that the supply of gas is finely divided and compelled to enter the water in numerous small jets, substantially as and for the purposes set forth.

9. The combination of a washing-chamber so constructed with an apparatus for producing a current of air to cause the gas to more certainly be passed through the water, substantially as described, and for the purposes mentioned.

10. The combination of the cooling-chamber, constructed as described, with the washing and purifying chambers, and also with the naphtha-fountain, substantially as set forth, so that it can be used both as a cooling-chamber and also as a naphtha reservoir or chamber in the production of fixed and vapor gas, substantially as set forth.

SILAS C. SALISBURY.

Witnesses:
S. D. LAW,
F. H. STOW.